United States Patent
Nagase et al.

(10) Patent No.: US 9,680,257 B2
(45) Date of Patent: Jun. 13, 2017

(54) CARD HOLDING MEMBER AND CARD CONNECTOR

(71) Applicant: Molex, LLC, Lisle, IL (US)

(72) Inventors: Teruki Nagase, Yamato (JP); Akihiro Shimotsu, Yamato (JP); Mitsuhiro Tomita, Yamato (JP); Takaaki Hirayama, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/044,829

(22) Filed: Feb. 16, 2016

(65) Prior Publication Data
US 2016/0261068 A1 Sep. 8, 2016

(30) Foreign Application Priority Data
Mar. 5, 2015 (JP) .................. 2015-043115

(51) Int. Cl.
| H01R 4/50 | (2006.01) |
| H01R 13/629 | (2006.01) |
| H01R 12/72 | (2011.01) |
| G06K 13/00 | (2006.01) |
| G06K 13/08 | (2006.01) |
| G06K 19/077 | (2006.01) |

(52) U.S. Cl.
CPC ....... *H01R 13/62933* (2013.01); *G06K 13/00* (2013.01); *G06K 13/085* (2013.01); *G06K 19/07739* (2013.01); *H01R 12/722* (2013.01)

(58) Field of Classification Search
CPC ............ H01R 13/62933; H01R 12/722; H01R 13/7032; H01R 12/721; G06K 13/0862; G06K 13/0806; G06K 13/08; G06K 13/085

USPC .......................................................... 439/345
See application file for complete search history.

(56) References Cited

U.S. PATENT DOCUMENTS

| 5,655,917 | A  | * | 8/1997 | Kaneshige | ............. | G06K 13/08 439/155 |
| 6,602,096 | B1 |   | 8/2003 | Kronestedt et al. | | |
| 7,059,911 | B2 |   | 6/2006 | Uchida et al. | | |
| 7,210,950 | B2 | * | 5/2007 | Tanaka | ............... | H01R 13/7032 439/188 |
| 7,220,138 | B2 | * | 5/2007 | Miyamoto | ......... | G06K 13/0806 439/159 |

(Continued)

FOREIGN PATENT DOCUMENTS

| CN | 202178465 U | 3/2012 |
| JP | 10-011550 A | 1/1998 |

*Primary Examiner* — Jean F Duverne
(74) *Attorney, Agent, or Firm* — James A. O'Malley (57) ABSTRACT

A card holding member is provided which is able to hold a card having terminal members and which is able to be inserted into a card connector. The card holding member includes a frame portion, side frame portions, and a movable lock portion. The frame portion includes a front frame portion positioned forward in the insertion direction of the card holding member into the card connector. The side frame portions are connected at both ends to the front frame portion. The movable lock portion is positioned on a side frame portion and is able to engage and disengage from a lock portion on the card connector. The movable lock portion receives force from the lock portion of the card connector forward in the insertion direction when engaging the lock portion of the card connector.

14 Claims, 8 Drawing Sheets

(56) References Cited

U.S. PATENT DOCUMENTS

| | | | |
|---|---|---|---|
| 7,438,599 B2 | 10/2008 | Uchida et al. | |
| 7,544,097 B2* | 6/2009 | Hong | G06K 13/0862 |
| | | | 439/157 |
| 2001/0055896 A1* | 12/2001 | Takada | G06K 13/085 |
| | | | 439/159 |
| 2008/0050954 A1* | 2/2008 | Maruyama | G06K 13/08 |
| | | | 439/155 |
| 2014/0017920 A1* | 1/2014 | Takasaki | H01R 12/721 |
| | | | 439/157 |

* cited by examiner

CARD HOLDING MEMBER AND CARD CONNECTOR

RELATED APPLICATIONS

This application claims priority to Japanese Application No. 2015-043115, filed Mar. 5, 2015, which is incorporated herein by reference in its entirety.

TECHNICAL FIELD

The present disclosure relates to a card holding member and a card connector.

BACKGROUND ART

Electronic devices such as mobile phones include a card connector enabling the use of various types of cards such as SIM (Subscriber Identity Module) cards.

Electronic devices have become significantly smaller in recent years, and so have cards and card connectors. As a result, it can be difficult for users to grasp a card with the fingers and insert the card properly into a card connector. Therefore, card connectors have been proposed in which a card is set inside a card tray and the card tray is inserted into the card connector (see, for example, Patent Document 1).

Figure 8:
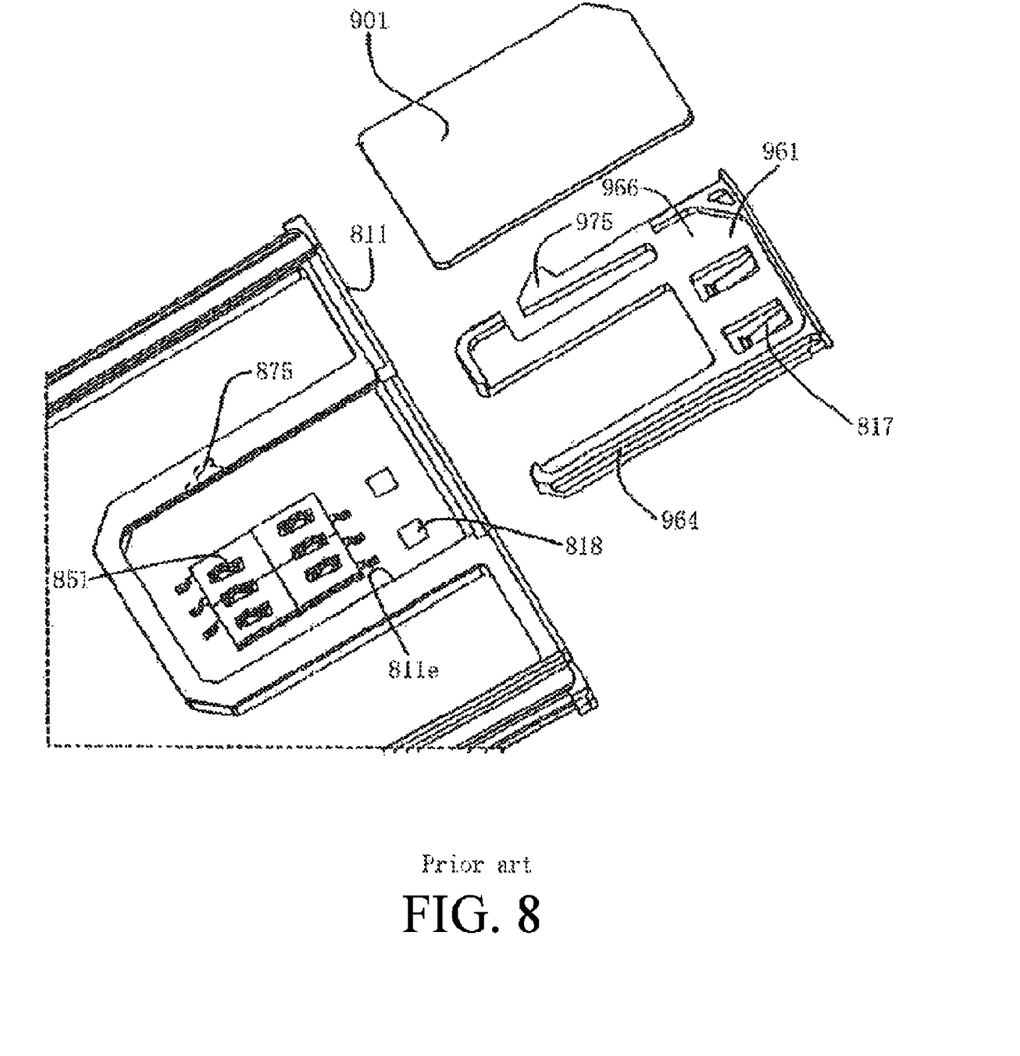
FIG. 8 is a perspective view of a card tray and a card connector of the prior art.

FIG. 8 is a perspective view of a card tray and a card connector of the prior art.

In this drawing, 961 is the frame member of a card tray made of a resin material, and 966 is space for accommodating a card 901. The card tray is inserted into the housing 811 of a card connector with a card 901 accommodated inside the space 966. The housing 811 includes a plurality of terminals 851 for establishing an electrical connection with a plurality of electrode pads on the lower surface of the card 901, and a detection switch terminal 818 for detecting the presence of an inserted card tray via contact with a detection switch terminal 817 on the card tray.

When the card tray is inserted into the housing 811, a pair of side frame portions 964, partially constituting the frame member 961, slide along and are guided by a pair of side wall portions 811e in the housing 811. A protruding portion of a latch member 975 on the card tray engages a recessed portion 875 formed on one of the side wall portions 811e, and the card tray is locked in the housing 811.

Patent Document 1-Laid-Open Patent Publication No. 2003-502738

SUMMARY

However, in the card tray of the prior art, the card tray is held inside the card connector only by the protruding portion of the latch member 975 engaging the recessed portion 875 formed in the side wall portion 811e of the housing 811. As a result, the positioning is not precise and there is some deviation in the position of the tray relative to the card connector.

When the card tray and the card connector are smaller, the dimensions of the electrode pads on the lower surface of the card 901 and the contact portions of the terminals 851 are very small. As a result, even a slight deviation in the positioning of the card tray in the card connector may cause a poor connection between the electrode pads of the card 901 and the terminals 851 of the card connector.

The present disclosure addresses the foregoing by providing a card holding member and a card connector enabling easy insertion of the card holding member into the card connector and reliable positioning of the card holding member inside the card connector.

The present disclosure is an embodiment of a card holding member able to hold a card having terminal members and able to be inserted into a card connector, the card holding member comprising: a frame portion including a front frame portion positioned forward in the insertion direction of the card holding member into the card connector, side frame portions connected at both ends to the front frame portion, and a movable lock portion positioned on a side frame portion and able to engage and disengage from a lock portion on the card connector; the movable lock portion receiving force from the lock portion forward in the insertion direction when engaging the lock portion of the card connector.

In another embodiment of a card holding member of the present disclosure, the front end surface of the front frame portion presses against the front end portion of the card connector in the card insertion space when the movable lock portion engages the lock portion of the card connector.

In another embodiment of a card holding member of the present disclosure, the movable lock portion is elastically displaceable in the transverse direction of the card holding member.

In another embodiment of a card holding member of the present disclosure, the lock portion of the card connector includes a rear inclined portion facing the outside in the transverse direction moving forward, the movable lock portion includes a lock side portion extending in the insertion direction, a rear inclined portion positioned farther to the rear in the insertion direction than the lock side portion, and a rear corner portion positioned at the boundary between the rear end of the lock side portion and the rear inclined portion, and the rear corner portion of the movable lock portion contacts the rear inclined portion of the lock portion of the card connector when the movable lock portion engages the lock portion of the card connector.

In another embodiment of a card holding member of the present disclosure, the side frame portions include inner frame portions facing the side ends of the card, outer frame portions including the movable lock portion, and slit portions separating the inner frame portion and the outer frame portion, the outer frame portions extending linearly in the longitudinal direction in the initial state.

In another embodiment of a card holding member of the present disclosure, the frame portion includes a metal portion composed of a metal plate and a resin portion coating at least a section of the metal portion on the periphery, the outer frame portion has a laminate structure of laminated metal and resin layers, and the movable lock portion is elastically displaceable on the direction perpendicular to the lamination direction of the laminate structure.

In another embodiment of a card holding member of the present disclosure, the metal portion includes a front metal frame portion, and the front end surface of the front metal frame portion is exposed to the front end surface of the front frame portion.

In another embodiment of a card holding member of the present disclosure, the frame portion includes a metal portion composed of a metal plate and a resin portion coating at least a section of the metal portion on the periphery, the metal frame portion not being exposed to the rear corner portion of the movable lock portion.

The present disclosure also provides an embodiment of a card connector able to receive an inserted card holding member described above, the card connector including a lock portion able to engage and disengage from the movable lock portion.

Another embodiment of a card connector of the present disclosure also includes a front end portion in the card insertion space able to abut the front end surface of the front frame portion.

Another embodiment of the present disclosure provides a card holding member and a card connector enabling easy insertion of the card holding member into the card connector and reliable positioning of the card holding member inside the card connector.

BRIEF DESCRIPTION OF THE DRAWINGS

FIGS. 1A and 1B are a pair of perspective views of a card tray inserted into a card connector according to an embodiment of the present disclosure, in which FIG. 1A is the view with the shell attached, and FIG. 1B is the view with the shell removed.

FIGS. 4A, 4B, 4C, 4D and 4E are a set of five views of the card tray according to an embodiment of the present disclosure, in which FIG. 4A is a front view, FIG. 4B is a top view, FIG. 4C is a rear view, FIG. 4D is a side view, and FIG. 4E is a bottom view.

FIGS. 6A and 6B are a pair of perspective views of the metal portion of the card tray in an embodiment of the present disclosure, in which FIG. 6A is a top view and FIG. 6B is a side view.

FIGS. 7A and 7B are a pair of perspective views of the card connector in an embodiment of the present disclosure, in which FIG. 7A is the view with the shell attached, and FIG. 7B is the view with the shell removed.

DETAILED DESCRIPTION OF THE PREFERRED EMBODIMENTS

The following is a detailed explanation of an embodiment of the present disclosure with reference to the drawings.

Figure 1A:
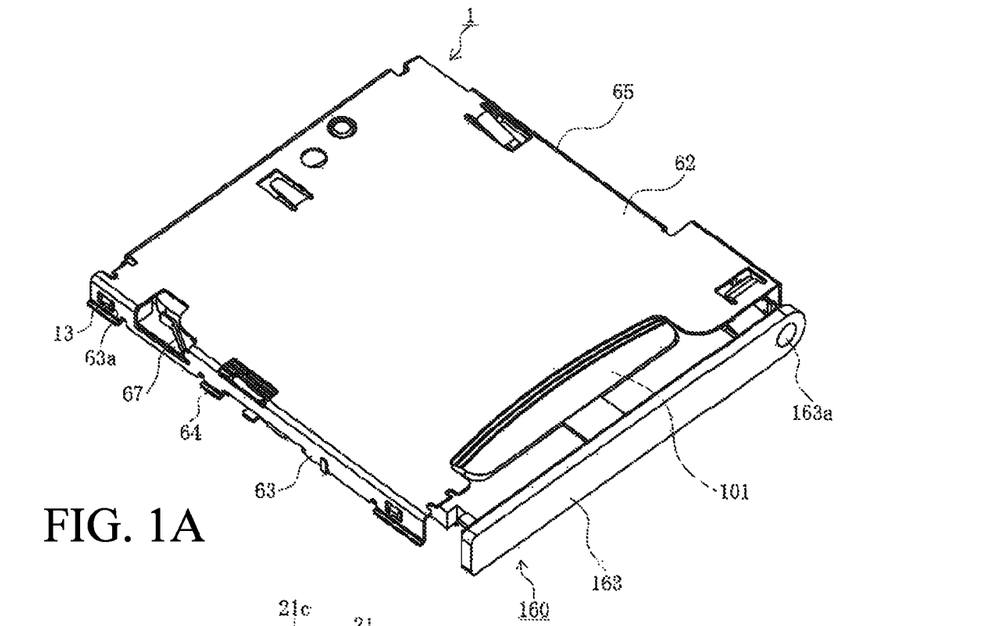
Figure 1B:
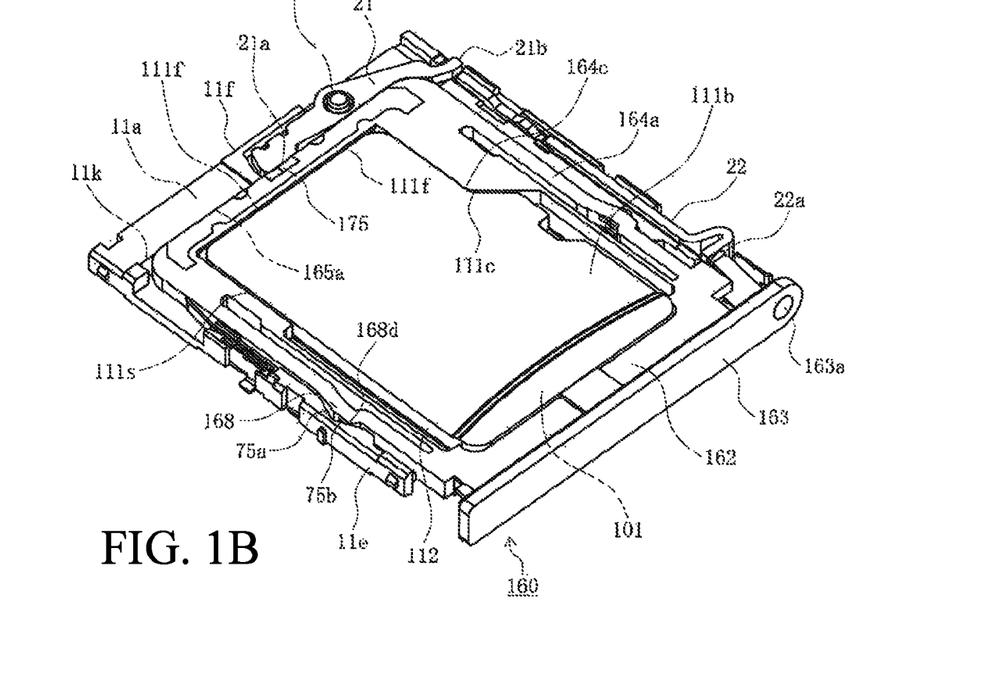

In the drawings, 160 is the card tray serving as the card holding member in the present embodiment. As shown in FIGS. 1A and 1B, it is inserted into a card connector 1 mounted in an electronic device (not shown) while housing a card 101. In other words, a card 101 is accommodated inside the card tray 160 with both side surfaces 112 surrounded by the frame portion 161 facing the side surfaces 112, and is mounted in an electronic device via a card connector 1. The electronic device may be any type of device, including a personal computer, a mobile phone, a smartphone, a communication modem, a tablet, a digital camera, a video camera, a music player, a gaming console, or a car navigation system.

However, when a card connector other than card connector 1 is mounted in an electronic device, the user sometimes does not use the card connector 1. In this case, the user can insert the empty card tray 160, that is, the card tray 160 not housing a card 101, into the card connector 1 for storage.

The card can be any type of memory card such as a SIM card, a microSIM card, MMC® multimedia card, SD® secure digital card, miniSD® card, xDPicture® card, Memory Stick®, Memory Stick Duo®, Smart Media®, or Trans-Flash® memory card. In the explanation of the present embodiment, the card is either a microSD® card or a nanoSIM card. The SD Card Association, which is the standard setting body for SD® cards, has set the size of microSD® cards at 15 mm×11 mm×1.0 mm (L×W×D). In accordance with the ETSI TS 102 221 V11.00 card standard, the nanoSIM card has a longitudinal length of 12.3 mm, a width of 8.8 mm, and a thickness of 0.67 mm.

Figure 2:
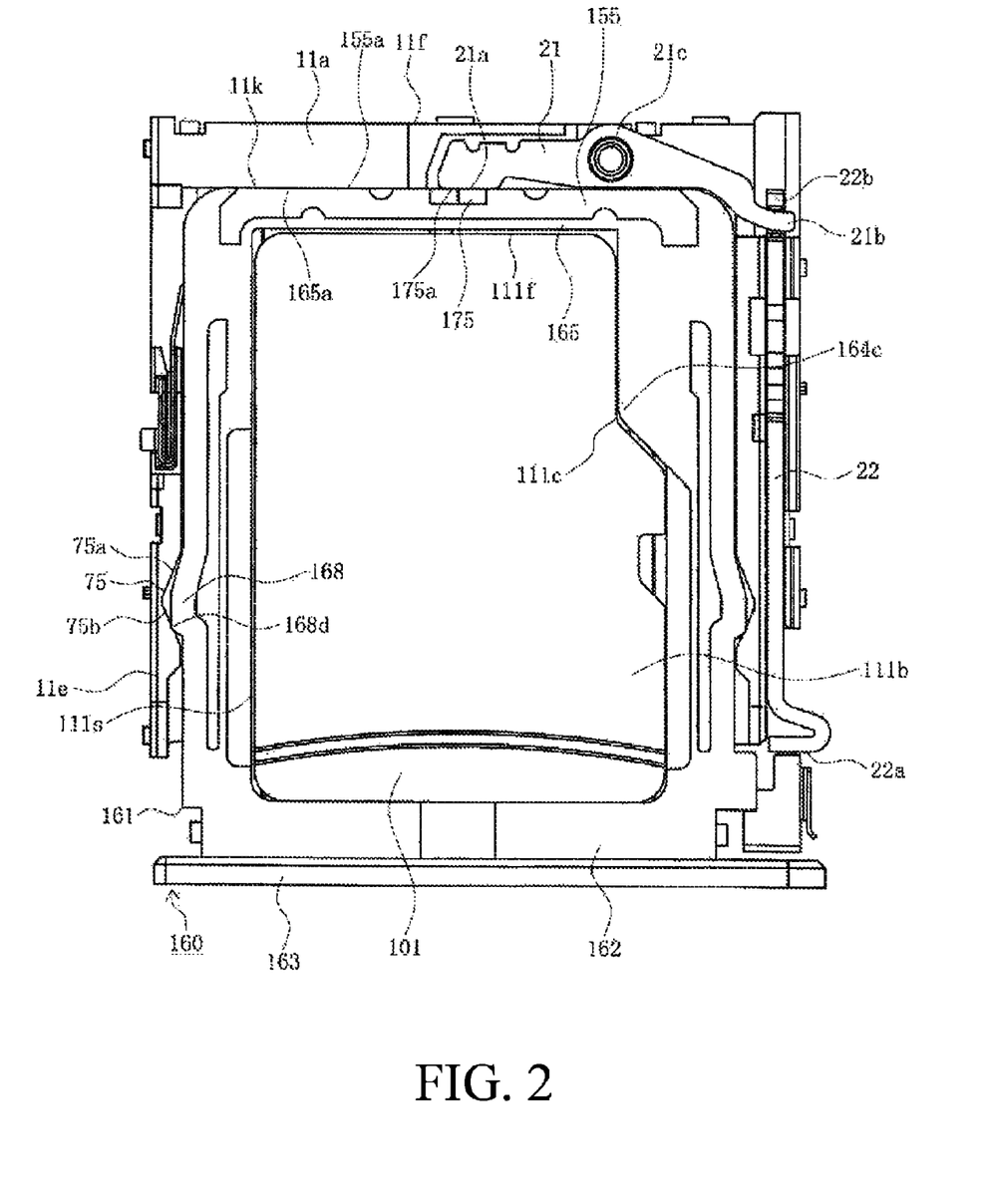
FIG. 2 is a top view showing the card tray inserted inside the card connector in an embodiment of the present disclosure in which the shell has been removed.
Figure 3:
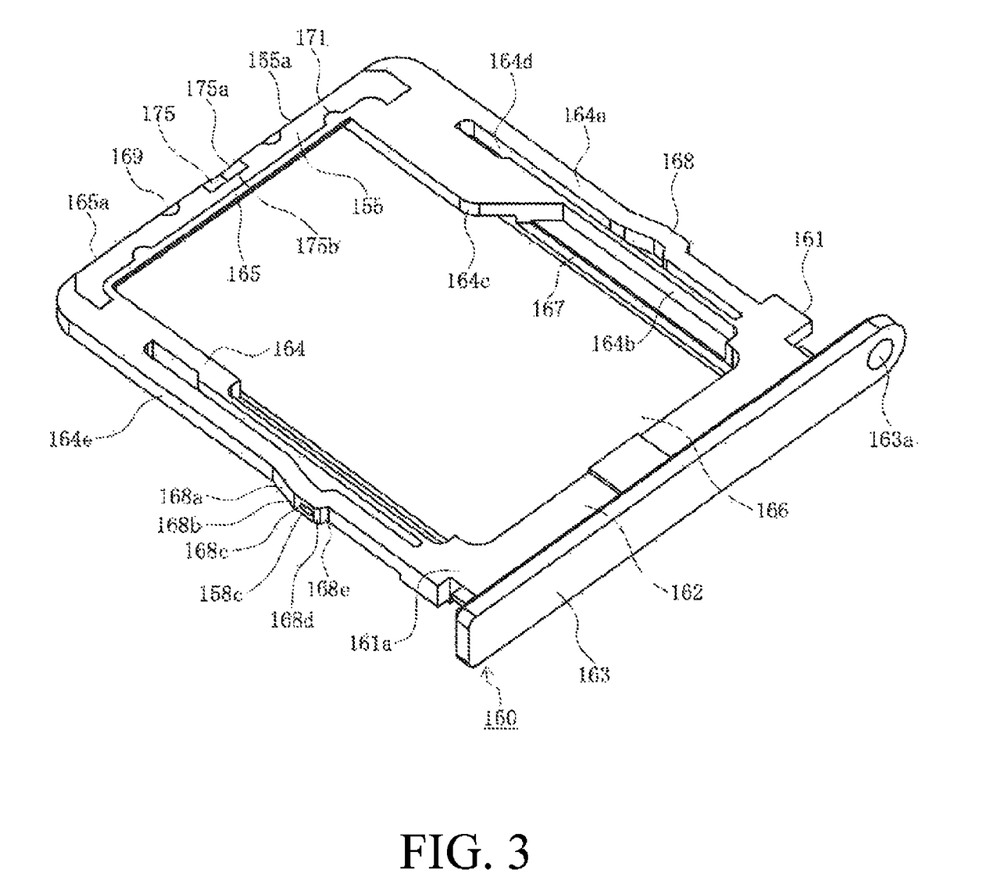
FIG. 3 is a perspective view of the card tray according to an embodiment of the present disclosure.
Figure 4A:
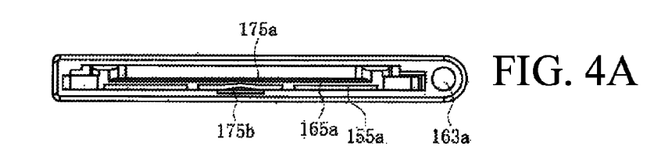
Figure 4B:
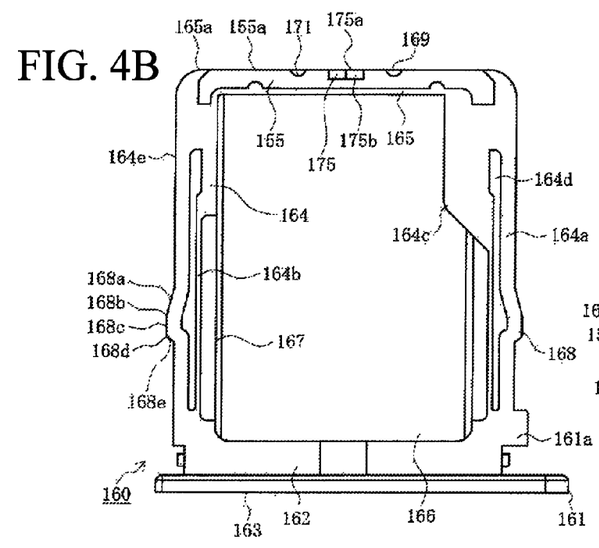
Figure 4C:
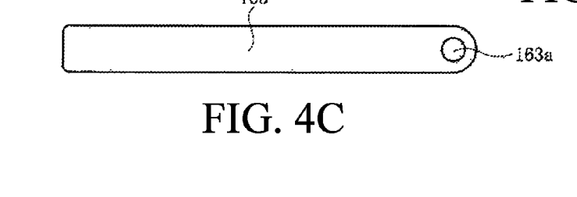
Figure 4D:
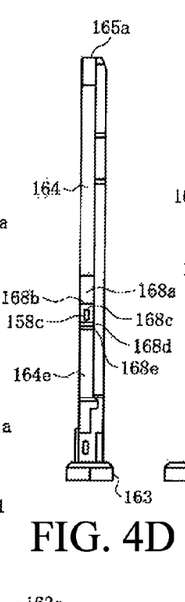
Figure 4E:
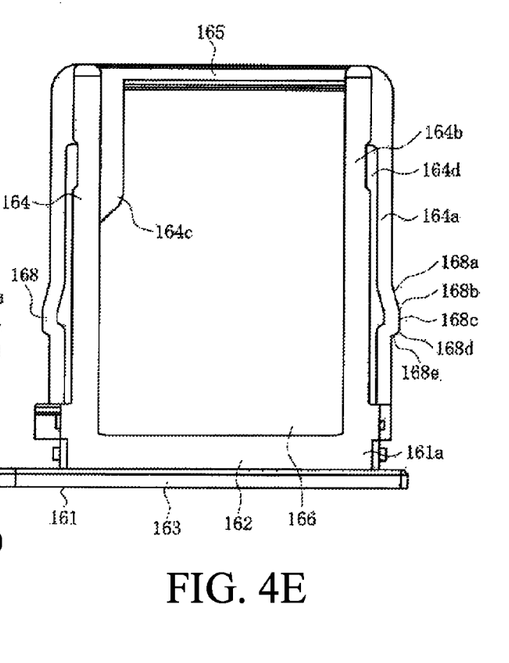
Figure 5:
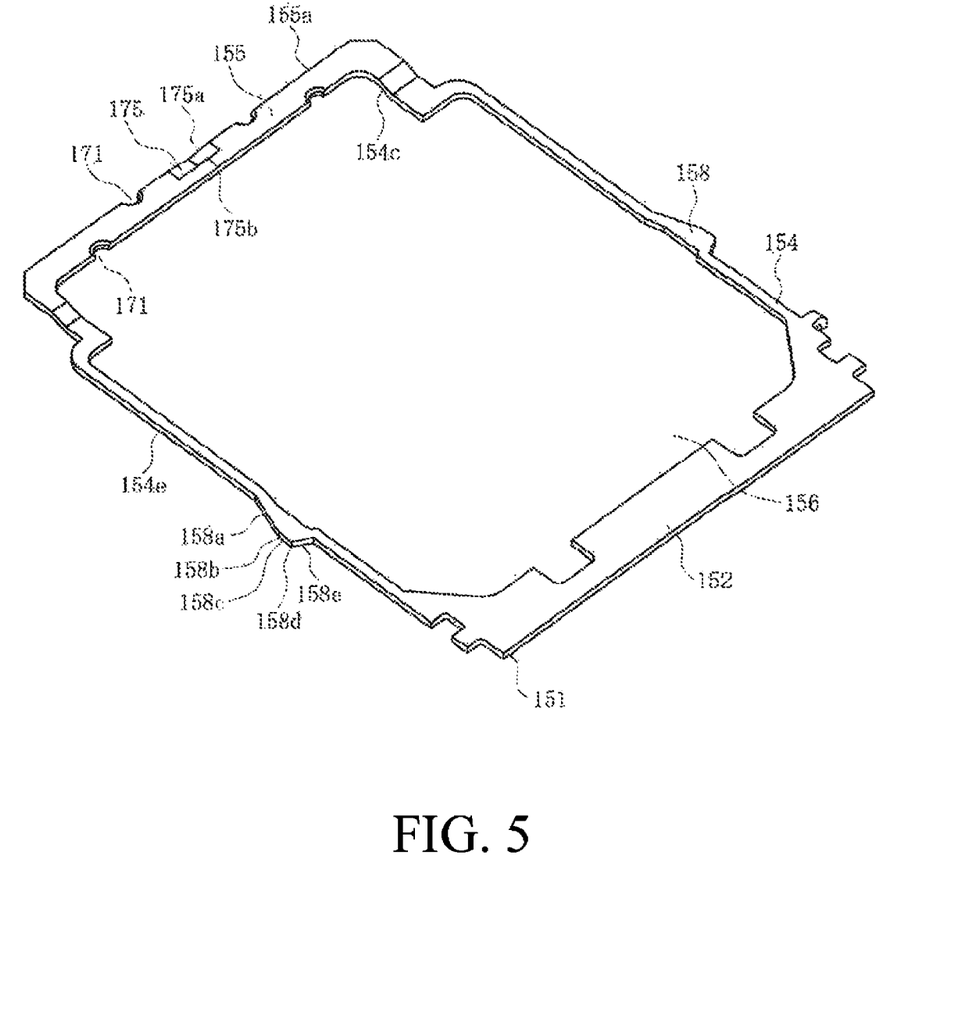
FIG. 5 is a perspective view of the metal portion of the card tray in an embodiment of the present disclosure.
Figure 6A:
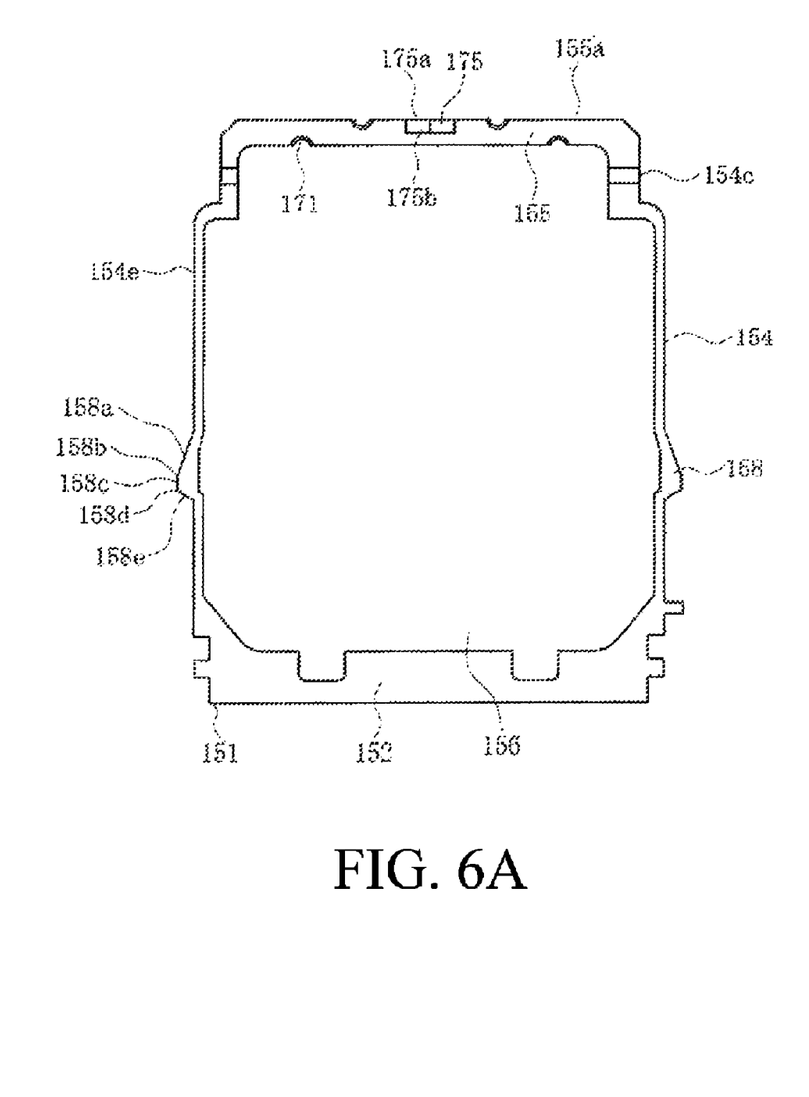
Figure 6B:
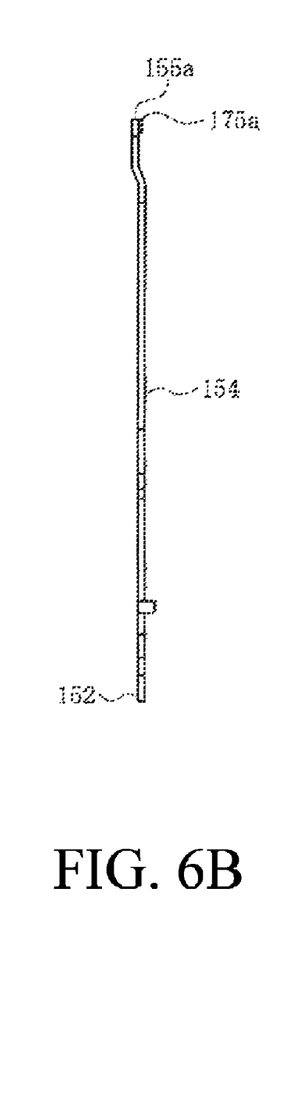

In the example shown in FIGS. 1A, 1B and 2, the card 101, which is a microSD® card, has a substantially rectangular band-like shape, and electrode pads serving as the terminal members (not shown) are arranged in rows along the front end 111f on one surface (the lower surface in the example shown in the drawing). Electrode pads are not provided on the other surface, that is, on the upper surface 111b opposite the lower surface. A notched portion 111c is formed in one of the corners connecting the left and right ends of the front end 111f to the side ends 111s. More specifically, this recessed portion is formed in the front right corner of the upper surface 111b. The notched portion 111c is formed by cutting away one of the corners where the front end 111f of the card 101 is connected to a side end 111s so as to form a truncated triangle.

In the present embodiment, the expressions indicating direction, such as upper, lower, left, right, front and rear, which are used to explain the configuration and operation of each portion of the card connector 1, card tray 160, and card 101, are relative and not absolute. They depend on the orientation of the card connector 1, card tray 160, and card 101, and their constituent components shown in the drawings. When the orientation of the card connector 1, card tray 160, and card 101 or their constituent components changes, the interpretation changes in response to the change in orientation.

Here, the card tray 160 includes a metal portion 151 integrally formed by stamping and bending a metal plate, and a resin portion 161a made of an insulating resin covering and becoming integrated with at least a section of the first metal portion 151 on the periphery using a molding technique such as insert molding or overmolding.

The frame portion 161 of the card tray 160 is a rectangular frame member surrounding all four sides of a space 166 serving as the card accommodating space for accommodating a card 101. It has a rear frame portion 162 and a front frame portion 165 extending parallel to each other in the transverse direction, and a pair of side frame portions 164 extending in the longitudinal direction and connected to both ends of the rear frame portion 162 and the front frame portion 165. Each of the side frame portions 164 includes an outer frame portion 164a and an inner frame portion 164b separated from each other by a narrow slit portion 164d extending in the longitudinal direction. The inner frame portion 164b faces the side ends 111s of the card 101, and the outer frame portion 164a faces the side wall portions 11e of the housing 11 when the card tray 160 is inserted into the card connector 1. The slit portions 164d pass through the side frame portions 164 in the thickness direction.

In the present embodiment, the outer frame portion 164a functions as a spring member holding the card tray 160 inserted into the card connector 1, the spring action elastically displacing the tray in the transverse direction of the card tray 160. A lock protruding portion 168 is formed in the outer frame portion 164a functioning as an engaging portion elastically displaced inward in the transverse direction of the card tray 160, and also functioning as a movable lock portion engaging a lock recessed portion 75 on the card connector 1 when the card tray 160 has been completely inserted into the card connector 1.

The outer frame portions 164a, when in the initial state, that is, when external force is not being applied, extend linearly in the longitudinal direction, and the outer surfaces 164e are flat with the exception of the lock protruding portions 168. The lock protruding portions 168 have a trapezoidal shape when viewed from above and extend outward from the outer surfaces 164e in the transverse direction. When the card tray 160 is inserted into the card connector 1, the lock protruding portions 168 come into contact with the side wall portions 11e of the housing 11 and are subjected to external force. At this time, the outer frame portions 164a are elastically displaced inwardly in the transverse direction of the card tray 160, but the displacement of the outer frame portions 164a is absorbed by the slit portions 164d and the inner frame portions 164b are not pressed against by the outer frame portions 164a.

Each lock protruding portion 168 includes a front inclined portion 168a, a front corner portion 168b, a plateau portion 168c serving as a lock side portion extending in the insertion direction of the card tray 160, a rear corner portion 168d, and a rear inclined portion 168e. The front inclined portion 168a and the rear inclined portion 168e are inclined surfaces inclining towards the outer surface 164e, and the plateau portion 168c is substantially flat on the outer side portion 164e and corresponds to the upper side of the trapezoid. The corner in the front corner portion 168b is positioned at the boundary between the front end of the plateau portion 168c and the front inclined portion 168a, and the corner in the rear corner portion 168d is positioned at the boundary between the rear end of the plateau portion 168c and the rear inclined portion 168e. The front corner portion 168b and the rear corner portion 168d do not have to form a corner strictly speaking, and may be chamfered or form a curve with a small radius when viewed from above.

A protruding portion 164c is formed in a corner, more specifically, the front right corner, where one of the side frame portions 164 is connected to the front frame portion 165. The protruding portion 164c functions as a card orientation restricting portion. As shown in the drawing, when the card 101 has the proper orientation, the card 101 is allowed to be housed inside the card tray 160. However, when the card 101 does not have the proper orientation, the card 101 is not allowed to be housed inside the card tray 160. In other words, the card 101 cannot be housed inside the space 166. More specifically, the protruding portion 164c has a truncated triangle profile and is formed in a way to correspond to the notched portion 111c of the card 101 housed inside the space 166 in the proper orientation. As a result, a card 101 cannot be inserted into and housed in the space 166 inside the card tray 160 when oriented improperly, that is, when inserted upside-down or backwards.

A rear panel portion 163 is connected to the rear of the rear frame portion 162. A through-hole 163a is formed at one end of the rear panel portion 163 and passes through the rear panel portion 163 in the thickness direction. The through-hole 163a allows an auxiliary member such as a pin or rod to be inserted in order to apply pressure and operate the operating portion 22a of the push rod 22 in the card connector 1.

The upper surfaces of the rear frame portion 162, the side frame portion 164, and the front frame portion 165, excluding the rear panel portion 163, are flush. However, the lower surface of the front frame portion 165 is preferably higher than the lower surface of the side frame portions 164. The lower surface of the front frame portion 165 is also preferably higher than the lower surface of a card 101 held inside the space 166. In this way, the front frame portion 165 does not make contact with the primary terminals 51 and secondary terminals 61 when the card tray 160 is inserted into the card connector 1.

Eaves portions 167 extend into the space 166 from the inner lower ends of the inner frame portions 164b of the left and right side frame portions 164. The eaves portions 167 function as card support portions for supporting at least some of the lower surface of the card 101 held inside the space 166, for example, near the side ends.

The side surfaces of the front frame portion 165, the rear frame portion 162, and the inner frame portions 164b facing the space 166, that is, the inside surfaces, are all coated with an insulating resin so that the metal portion 151 is not exposed. Therefore, even though the peripheral edges of the electrode pads arranged on the lower surface of the cards 101 housed inside the space 166 are exposed on the side surfaces 11a of the cards, they do not come into contact with the metal portion 151.

The metal portion 151 is a frame member made from a 0.2 mm-thick metal plate with a substantially rectangular profile surrounding the four sides of the opening corresponding to the space 166, and includes a rear metal frame portion 152 and a front metal frame portion 155 extending in the transverse direction substantially parallel to each other, and a pair of metal side frame portions 154 extending on the longitudinal direction and connecting both ends of the rear metal frame portion 152 to both ends of the front metal frame portion 155.

The rear metal frame portion 152, the metal side frame portions 154, and the front metal frame portion 155 are flat members extending parallel to the upper and lower surfaces of the side frame portions 164 and the front frame portion 165. The front metal frame portion 155 is connected to the metal side frame portions 154 via connecting portions 154c extending in the thickness direction of the card tray 160 (the vertical direction) and positioned above the metal side frame portions 154.

In the present embodiment, the metal side frame portions 154 correspond not to the inner frame portion 164b but rather to the outer frame portion 164a of the side frame portions 164, and at least the upper surface or the lower surface is coated with a resin portion 161a formed using a molding method such as insert molding or overmolding to form the outer frame portion 164a. In other words, each outer frame portion 164a includes a laminate structure formed by laminating a metal layer composed of the metal plate forming the metal side frame portion 154 and a resin layer composed of the resin portion 161a covering the upper surface or the lower surface of the metal side frame portion 154. The laminate structure can have a different number of layers in different orders. For example, it may be a two-layer structure composed of a metal side frame portion 154 and a resin portion 161a covering the upper surface of the metal side frame portion 154, or it may be a two-layer structure composed of a metal side frame portion 154 and a resin portion 161a covering the lower surface of the metal side frame portion 154. Here, it is a three-layer structure composed of a metal side frame portion 154 and resin portions 161a covering both the upper surface and the lower surface of the metal side frame portion 154.

Each metal side frame portion 154 includes a metal protruding portion 158 formed in the location corresponding to a lock protruding portion 168. The metal side frame portions 154, when in the initial state, that is, when external force is not being applied, extend linearly in the longitudinal direction, and the outer surfaces 154e are flat with the exception of the metal protruding portions 158. The metal protruding portions 158 have a trapezoidal shape when viewed from above and extend outward from the outer surfaces 154e in the transverse direction.

Each metal protruding portion 158 includes a front inclined portion 158a, a front corner portion 158b, a plateau portion 158c, a rear corner portion 158d, and a rear inclined portion 158e. The front inclined portion 158a and the rear inclined portion 158e are inclined surfaces inclining towards the outer surface 154e, and the plateau portion 158c is substantially flat on the outer side portion 154e and corresponds to the upper side of the trapezoid. The corner in the front corner portion 158b is positioned at the boundary between the front end of the plateau portion 158c and the front inclined portion 158a, and the corner in the rear corner portion 158d is positioned at the boundary between the rear end of the plateau portion 158c and the rear inclined portion 158e. The plateau portion 158c is exposed so as to be flush with the plateau portion 168c of the lock protruding portion 168, and the front inclined portion 158a, the front corner portion 158b, the rear corner portion 158d, and the rear inclined portion 158e subside into the outer frame portion 164a and the lock protruding portion 168 but are not exposed. Similarly, the outer surface 154e subsides into the outer frame portion 164a and the lock protruding portion 168 but are not exposed.

Anchoring recessed portions 171 in the form of semicircular recessed portions are formed at multiple locations on the front edge and rear edge of the front metal frame portion 155. Some of the resin portion 161a formed using a molding method such as insert molding or overmolding enter the anchoring recessed portions 171 to form anchoring portions 169. Because of the so-called anchoring effect, the metal portion 151 and the resin portion 161a are more securely integrated. The number and location of anchoring recessed portions 171 are not limited to the example shown in the drawings and can be altered.

In the example shown in the drawing, the rear metal frame portion 152 subsided in the rear frame portion 162 and the side frame portions 164. The metal side frame portions 154 also subside into the outer frame portions 164a of the side frame portions 164 except for the plateau portion 158c. The front metal frame portion 155 is exposed so that the upper surface and the front end surface 155a are flush with the upper surface of the front frame portion 165 and the front end surface 165a with the rest subsiding into the front frame portion 165.

A subsiding portion 175 is formed in the front metal frame portion 155. The subsiding portion 175 is formed where the abutting portion of a member of the card connector 1 abuts the front end surface 165a of the front frame portion 165 of the card tray 160 inserted into the card connector 1. The abutting portion is any member of the card connector 1 that can abut the front end surface 165a of the front frame portion 165 of the card tray 160 inserted into the card connector 1. Here, it is the force output portion 21a of the ejection lever 21 in the card connector 1. In the example shown in the drawing, the subsiding portion 175 is formed near the center of the card tray 160 in the transverse direction. However, it can be formed in any location that abuts the force output portion 21a of the ejection lever 21.

The subsiding portion 175 has a V-notched section which has a V-shaped profile when viewed from the front and which has a downward insertion section near the front end surface 155a of the front metal frame portion 155. In other words, the subsiding portion 175 is a continuous, unbroken recessed portion with left and right descending portions when viewed from the front. The front surface 175a of the subsiding portion 175 is flush with the front end surface 155a of the front metal frame portion 155 and includes a section which is exposed to the front end surface 165a of the front frame portion 165 and which is displaced (downward) in the thickness direction of the front frame portion 165 from the front end surface 155a of the front metal frame portion 155. The upper surface 175b of the subsiding portion 175 is a pair of descending surfaces which are continuous and unbroken with the upper surface of the front metal frame portion 155.

The subsiding portion 175 and the front metal frame portion 155 including the subsiding portion 175 are strong, and the subsiding portion 175 and the front metal frame portion 155 including the subsiding portion 175 are not deformed. Some of the resin portion 161a formed using a molding method such as insert molding or overmolding enters the subsiding surface 175 from the rear to provide an anchoring effect that more securely integrates the front metal frame portion 155 and the front frame portion 165.

Figure 7A:
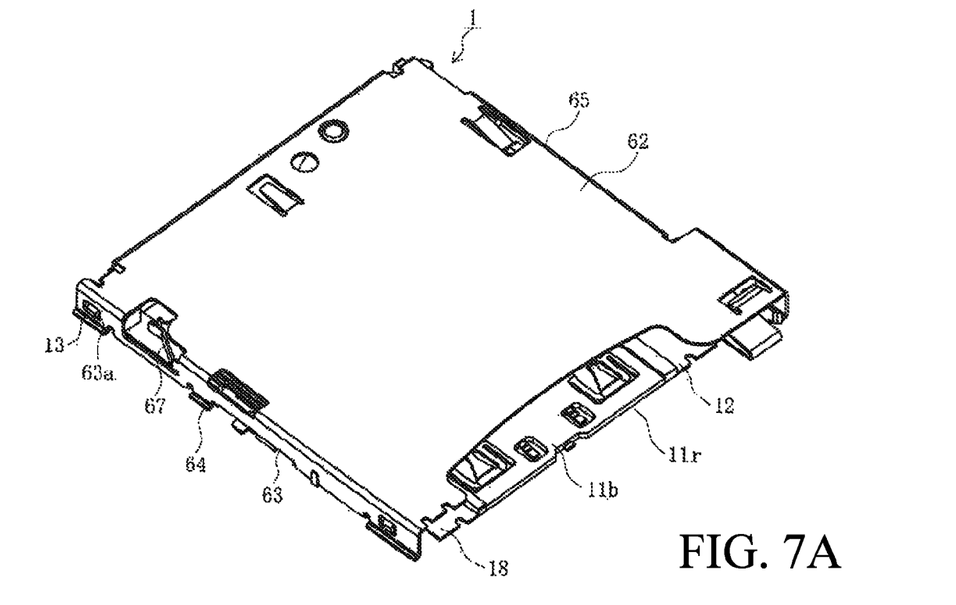
Figure 7B:
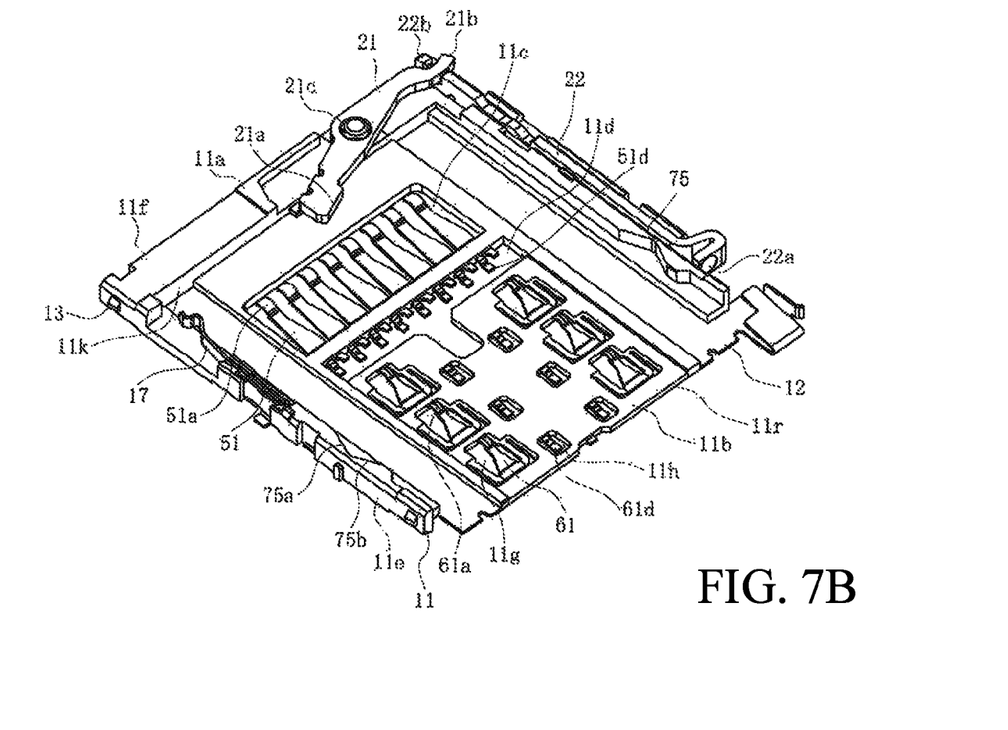

In the present embodiment, as shown in FIGS. 7A and 7B, the card connector 1 has a housing 11 integrally molded from an insulating material such as a synthetic resin, and a shell 65 or cover member formed integrally by punching and bending a conductive metal sheet which is attached to the upper side of the housing 11. The shell 65 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. The card connector 1 has a substantially parallelepiped shape, and is mounted on the surface of a board such as a printed circuit board in the electronic device. A card tray 160 is inserted into the insertion slot 18 in the rear (below right in FIG. 7A). More specifically, the card tray 160 is inserted into the card insertion space between the housing 11 and the shell 65.

The housing 11 includes primary terminals 51, secondary terminals 61, and a lower shell 12 integrally formed by stamping and bending a metal plate. This substantially plate-like member is integrally molded using a molding technique such as insert molding or overmolding with an insulating resin which covers and becomes integrated with at least a portion of the primary terminals 51, secondary terminals 61, and a lower shell 12. The lower shell 12 is a frame member for reinforcing the housing 11, and is preferably formed from the same material as the primary terminals 51 and/or secondary terminals 61, but is electrically insulated from the primary terminals 51 and the secondary terminals 61.

The housing 11 also includes a bottom wall portion 11b serving as the substantially rectangular, plate-like terminal holding portion, an inner wall portion 11a thicker than the bottom wall portion 11b which extends in the transverse direction of the housing 11 along the front end portion 11f in the insertion direction (longitudinal direction) of the card tray 160, and a pair of side wall portions 11e thicker than the bottom wall portion 11b extending in the insertion direction of the housing 11 along both side edges. The lower surfaces of the inner wall portion 11a and the side wall portions 11e are flush with the lower surface of the bottom wall portion 11b, and the upper surfaces are above the upper surface of the bottom wall portion 11b. The end portion of the housing 11 in the insertion direction of the card tray 160 is referred to as the rear end portion 11r.

Here, the bottom wall portion 11b includes a primary terminal holding recessed portion 11c and secondary terminal holding recessed portions 11g for holding the exposed portions of the primary terminals 51 and the secondary terminals 61, as well as a primary terminal solder tail opening 11d and secondary terminal solder tail openings 11h. The primary terminal holding recessed portion 11c, secondary terminal holding recessed portions 11g, primary terminal solder tail opening 11d, and secondary terminal solder tail openings 11h are openings which pass through the bottom wall portion 11b in the thickness direction.

There is a single primary terminal holding recessed portion 11c and primary terminal solder tail opening 11d, and a single row of primary terminals 51 extending in the transverse direction of the housing 11 is arranged inside. At least a portion of the primary terminals 51 is embedded in the bottom wall portion 11b, and at least the contact portion 51a is exposed inside the primary terminal holding recessed portion 11c. The solder tail portion 51d of each terminal to be soldered is also exposed inside the primary terminal solder tail opening 11d. The contact portion 51a of each primary terminal 51 is biased upwards by the spring action of the arm portion, and comes into contact with the corresponding electrode pad on the card 101 inside the card tray 160 held inside the card connector 1. Each solder tail portion 51d is connected electrically by solder to a signal line, contact pad, or terminal formed on a printed circuit board.

The secondary terminal holding recessed portions 11g and the secondary terminal solder tail openings 11h are arranged side by side to form rows extending in the longitudinal direction of the housing 11. In the example shown in the drawing, there are two rows of three. At least a portion of each secondary terminal 61 is embedded in the bottom wall portion 11b, and at least a contact portion 61a is exposed inside each secondary terminal holding recessed portion 11g. A solder tail portion 61d to be soldered is exposed in each secondary terminal solder tail opening 11h. Therefore, the secondary terminals 61 held in each secondary terminal holding recessed portion 11g are arranged in two rows extending in the longitudinal direction of the housing 11. At least a portion of each secondary terminal 61 is embedded in the bottom wall portion 11b, and at least the contact portion 61a is exposed inside a secondary terminal holding recessed portion 11g. The contact portion 61a of each secondary terminal 61 is biased upwards by the spring action of the arm portion, and comes into contact with the corresponding electrode pad on the card 101 inside the card tray 160 held inside the card connector 1. Each solder tail portion 61d is connected electrically by solder to a signal line, contact pad, or terminal formed on a printed circuit board.

The primary terminals 51 are arranged so as to match the electrode pads on a microSD® card, and the secondary terminals 61 are arranged so as to match the electrode pads on a nanoSIM® card. In other words, the card connector 1 can accommodate different types of cards 101 in the card tray 160. For example, it can accommodate a card 101 that is a microSD® card or a nanoSIM® card. The number and arrangement of primary terminals 51 and secondary terminals 61 can be changed if necessary to conform to the number and arrangement of electrode pads on a card 101. When the card tray 160 can only accommodate a single type of card 101, either the primary terminals 51 or the secondary terminals 61 can be omitted.

The lower shell 12 is exposed between the bottom wall portion 11b and the left and right side wall portions 11e.

Lock recessed portions 75 are formed on the inner surfaces of the side wall portions 11e extending linearly in the longitudinal direction which engage lock protruding portions 168 formed on the outer frame portion 164a of the card tray 160 to hold and secure the card tray 160. The lock recessed portions 75 have a substantially triangular profile in plan view, and are recessed portions protruding outward in the transverse direction from the inner surfaces of the side wall portions 11e. Each lock recessed portion 75 includes a front inclined portion 75a and a rear inclined portion 75b. The front inclined portion 75a and the rear inclined portion 75b are inclined surfaces inclined towards the inner surfaces of the side wall portions 11e and are the portions corresponding to the hypotenuse of the triangle.

A push rod 22 is slidably mounted in the longitudinal direction on the inside surface of one of the side wall portions 11e to serve as the tray ejection operation member in the tray ejection mechanism for ejecting the card tray 160 inserted into the card connector 1. The push rod 22 is a linear rod-shaped or band-shaped member, and a bent operating portion 22a is integrally connected to the rear end portion. An engaging portion 22b is formed in the front end portion of the push rod 22 to engage the force input portion 21b of the ejection lever 21. The ejection lever 21 is a lever-shaped member arranged near the inner wall portion 11a, and functions as the tray ejection lever of the tray ejection mechanism. As a result, the ejection lever 21 is pivotally mounted on the bottom wall portion 11b at the fulcrum portion 21c. The end on the other side of the fulcrum portion 21c from the force input portion 21b functions as the force output portion 21a which comes into contact with the front frame portion 165 of the card tray 160 inserted into the card connector 1 and applies force to the card tray 160 in the direction of ejection.

The shell 65 has side panel portions 63 extending from the side edges of a ceiling panel portion 62. A plurality of locking openings 63a are formed on the side panel portions 63. When the shell 65 is mounted on the upper side of the housing 11, the locking openings 63a are engaged by locking protrusions 13 formed on the outside surfaces of the side wall portions 11e of the housing 11, and the shell 65 is secured on the housing 11. Also, solder tail portions 64 are formed at any location on the lower end of the side panel portions 63. These serve as board-connectors and stand erect from the side panel portions 63 and extend outward in the transverse direction of the shell 65. The solder tail portions 64 are secured by soldering to anchoring pads formed on the surface of the board.

The housing 11 includes a movable member 17 for a detection switch used to detect whether a card tray 160 inserted into the card connector 1 has reached a predetermined position inside the card connector 1 (the position at which insertion of the card tray 160 is complete). When the card tray 160 has not reached the predetermined position, the movable member 17 and the fixed member 16 are separate, and the detection switch is not electrified or turned OFF. However, when the card tray 160 reaches the predetermined position, the movable member 17 presses against the side frame portions 164 of the card tray 160, and the movable member 17 comes into contact with the fixed member 67. Because this electrifies or turns the detection switch ON, it is determined that the card tray 160 has reached the predetermined position.

The following is an explanation of the operations performed by a card connector 1 with the configuration described above. First, the operations performed to insert the card tray 160 will be explained.

The user manually inserts a card tray 160 housing a card 101 into the insertion slot 18 in the rear of the card connector 1. Here, the card tray 160 is inserted properly with the upper surface facing upwards towards the ceiling panel portion 62 of the shell 65, the lower surface facing downwards towards the bottom wall portion 11b of the housing 11, and the front frame portion 165 facing the front end portion 11f of the housing 11. As a result, the upper surface 111b of the card 101 housed inside the space 166 which does not include any electrode pads faces upwards, and the lower surface including electrode pads and exposed on the lower surface of the card tray 160 is facing downwards. The card tray 160 can be inserted into the card connector 1 and ejected from the card connector 1 whether the tray is housing a card 101 or not housing a card 101. In the following explanation, the tray is housing a card 101. As mentioned above, the card 101 is a microSD® card.

When the card tray 160 is inserted from the insertion slot 18 into the card insertion space formed between the housing 11 and the shell 65, the card tray 160 advances into the card insertion space with the lower surfaces of the side frame portions 164 approaching or making contact with the upper surface of the lower shell 12 and the outer surfaces of the side frame portions 164 sliding along and being guided by the inner surfaces of the side wall portions 11e of the housing 11. Next, the lock protruding portions 168 extending outward in the transverse direction from the outer surfaces 164e of the side frame portions 164 of the card tray 160 make contact with the inner surface of the side wall portions 11e of the housing 11 and are elastically displaced inwardly in the transverse direction of the card tray 160.

Here, the linear outer frame portions 164a in which lock protruding portions 168 are formed near the middle in the longitudinal direction function as beam-like spring plates supported on both ends and are elastically displaced inward in the transverse direction. However, because the displacement is absorbed by the slit portions 164d, they do not interfere with the inner frame portions 164b. Therefore, the inner frame portions 164b and the card 101 inside are not subjected to a load and are not damaged. Also, the outer frame portions 164a are flexible and can be elastically displaced so as to reliably function as plate springs.

Because the outer frame portions 164a include metal side frame portions 154 which are more rigid than the resin portion 161a, they exert sufficiently strong force despite being slender. Also, because the metal side frame portions 154 are displaced in the transverse direction of the card connector 160 more than in the thickness direction, they are rigid and yet able to exert strong spring action. Because the outer frame portions 164a have a laminate structure consisting of a metal layer composed of a metal side frame portion 154 and a resin layer composed of a resin portion 161a, and this laminate structure is deformed in the direction (the width direction of the card tray 160) perpendicular to the lamination direction (the thickness direction of the card tray 160), there is no difference in the amount of displacement occurring between adjacent layers, and the metal side frame portion 154 and the resin portion 161a do not separate. As a result, the outer frame portions 164a are rigid and exert strong spring action.

When the lock protruding portions 168 come into contact with the inner surfaces of the side wall portions 11e and begin to be displaced, the front inclined portions 168a of the lock protruding portions 168 come into contact with the rear end portion 11r of the side wall portions 11e, and the lock protruding portion 168 begins to be displaced, thereby smoothly displacing the lock protruding portions 168 and the outer frame portions 164a. As a result, the user can smoothly push in the card tray 160 without having to use a large amount of force to push in the card tray 160.

Next, when the user pushes in the card tray 160, as shown in FIGS. 1A and 1B, the card tray 160 reaches the predetermined position inside the card connector 1. At this time, the movable member 17 is pushed by the front frame portion 165 and comes into contact with the fixed member 67, turning the detection switch ON to indicate that the card tray 160 has reached the predetermined position inside the card tray 1.

As the card tray 160 advances to the predetermined position inside the card connector 1, the force output portion 21a of the ejection lever 21 is pushed by the front frame portion 165 and displaced further in the direction of the front end portion 11f, and the push rod 22 slides to the position protruding farthest to the rear.

When the card tray 160 reaches the predetermined position inside the card connector 1, the force output portion 21a of the ejection lever 21 is interfered with by the inner wall portion 11a of the housing 11 and cannot be displaced any further in the direction of the front end portion 11f. Also, the front end surface 165a of the front frame portion 165 comes into contact with the front end portion 11k of the card insertion space in the housing 11. As a result, the card tray 160 cannot advance any further.

In addition, when the card tray 160 reaches the predetermined position inside the card connector 1, the lock protruding portions 168 on the pair of left and right outer frame portions 164a are biased by the spring action of the outer frame portions 164a and elastically displaced outwardly in the transverse direction of the card tray 160 to engage the lock recessed portions 75 formed on the inner surfaces of the side wall portions 11e.

Here, as shown in FIG. 2, the rear corner portions 168d of the lock protruding portions 168 come into contact with the rear inclined portions 75b of the lock recessed portions 75. The rear inclined portions incline outward in the transverse direction of the card connector 1 moving forward, and the rear corner portions 168d are biased by the spring action of the outer frame portions 164a outward in the transverse direction of the card connector 1, coming into contact with the rear inclined portions 75b. Therefore, the rear corner portions 168d slide along the rear inclined portions 175b, and are displaced in the forward direction so as to face outward in the transverse direction of the card connector 1. As a result, the card tray 160 is biased in the forward direction, and the front end surface 165a serving as the reference surface for the front frame portion 165 presses against the front end portion 11k of the card insertion space serving as the reference surface of the housing 11, thereby reliably holding the card tray 160 in the predetermined position inside the card connector 1. Also, the card tray 160 is kept from being displaced to the rear from the predetermined position.

The front end surface 165a of the front frame portion 165 does not experience damage or wear because the front end surface 155a of the front metal frame portion 155 is exposed. Therefore, the front end surface 165a continues to function as the reference surface even after long-term use.

As mentioned above, excluding the plateau portions 158c, the metal side frame portions 154, excluding the plateau portions 158c, subside into the outer frame portions 164a of the side frame portions 164 and are exposed to the rear corner portions 168d. Therefore, the rear inclined portions 75b of the lock recessed portions 75 do not experience damage or wear even through the rear corner portions 168d of the lock protruding portions 168 slide along them. While card trays 160 are easily replaceable, the card connector 1 is mounted in the electronic device and is either very difficult or impossible to replace. Therefore, this has the significant effect of preventing damage or wear to the rear inclined portions 75b of the lock recessed portions 75.

The card 101 housed inside the card tray 160 can exchange data along with the card tray 160 at the predetermined position using an arithmetic processing means in the electronic device mounted in the card connector 1. When the card 101 is held in the predetermined position, the contact portions 51a of the primary terminals 51 make contact with the electrode pads on the card 101 and establish an electrical connection.

The following is an explanation of the operations performed to eject a card tray 160 from the card connector 1.

First, the user manually inserts an auxiliary member such as a pin or rod into the through-hole 163a formed in the rear panel portion 163 from the rear of the card tray 160, and the tip of the auxiliary member is brought into contact with the operating portion 22a of the push rod 22. When the user pushes in the push rod 22 via the auxiliary member, the force input portion 21b of the ejection lever 21 engaging the engaging portion 22b of the push rod 22 is displaced forward. At this time, the card tray 160 is locked because the lock protruding portions 168 on the outer frame portions 164a are engaging the lock recessed portions 75 formed on the inner surfaces of the side wall portions 11e. However, when the user applies sufficient manual force and operating portion 22a of the push rod 22 is pushed in, the lock protruding portions 168 are easily displaced inwardly in the transverse direction of the card tray 160 and are easily unlocked, allowing the card tray 160 to move towards the rear end portion 11r. The detection switch turns OFF, and movement of the card tray 160 to the rear from the predetermined position is detected.

In this way, the rear panel portion 163 of the card tray 160 protrudes sufficiently from the insertion slot 18 of the card connector 1. This allows the user to grasp the rear panel portion 163 and remove the card tray 160 from the card connector 1.

Because the front end surface 155a of the front metal frame portion 155 is exposed on the front surface, the front frame portion 165 is not damaged even when the force sustained from the force output portion 21a of the ejection lever 21 is strong.

However, the force output portion 21a of the ejection lever 21 is usually thinner than the front frame portion 165. Also, because of inevitable dimensional errors in the thickness direction of the various components in the card tray 160 and the card connector 1, the positional relationship between the front frame portion 165 and the force output portion 21a of the ejection lever 21 in the vertical direction may vary somewhat. Also, because of mounting errors when the ejection lever 21 is mounted on the bottom wall portion 11b of the housing 11, the entire ejection lever 21 swings around the fulcrum portion 21c in the thickness direction and the force output portion 21a is displaced in the thickness direction. As a result, the position at which the force output portion 21a of the ejection lever 21 abuts the front end surface 165a of the front frame portion 165 is sometimes lower than the front end surface 155a of the front metal frame portion 155.

In the present embodiment, a subsiding portion 175 is formed in the front metal frame portion 155 where it abuts the force output portion 21a of the ejection lever 21 with respect to the transverse direction. The front surface 175a of the subsiding portion 175 is flush with the front end surface 155a of the front metal frame portion 155 and the front end surface 165a of the front frame portion 165 and the front surface 175a includes a section with V-shaped descending portions in the vertical direction. Therefore, the range in which the front surface 175a of the subsiding portion 175 extends vertically is greater than the range in which the front end surface 155a of the front metal frame portion 155 excluding the subsiding portion 175 extends vertically and within the range in which the front end surface 165a of the front frame portion 165 extends in the thickness direction. As a result, the force output portion 21a of the ejection lever 21 abuts the front surface 175a of the subsiding portion 175 even when the force output portion 21a is lower than the front end surface 155a of the front metal frame portion 155.

Because the force output portion 21a of the ejection lever 21 abuts the front end surface 155a of the front metal frame portion 155 in this way, the front frame portion 165 is not damaged.

In the present embodiment, the card tray 160 is able to hold a card 101 with electrode pads and is able to be inserted into a card connector 1. The card tray 160 comprises a frame portion 161 containing a front frame portion 165 positioned in the front of the card tray 160 in the direction of insertion into the card connector 1, side frame portions 164 connected on both ends to the front frame portion 165, and a frame portion 161 arranged on the side frame portions 164 including lock protruding portions 168 able to engage with and disengage from the lock recessed portions 75 of the card connector 1. When the lock portions 168 engage the lock recessed portions 75 of the card connector 1, force is sustained towards the front in the insertion direction of the lock recessed portions 75.

As a result, the card tray 160 can be easily inserted into the card connector 1 and easily retained in a predetermined position in the card connector 1.

When the lock protruding portions 168 engage the recessed portions 75 of the card connector 1, the front end surface 165a of the front frame portion 165 presses against the front end portion 11k in the card insertion space of the card connector 1. Because the front end surface 165a serving as the reference surface for the card tray 160 abuts the front end portion 11k in the card insertion space functioning as the reference surface for positioning the card tray 160, the card tray 160 is accurately situated in the predetermined position inside the card connector 1.

Each lock recessed portion 75 of the card connector 1 includes a rear inclined portion 75b inclined outward in the transverse direction moving forward, and each lock protruding portion 168 includes a plateau portion 168c extending in the insertion direction, a rear inclined portion 168e positioned farther to the rear than the plateau portion 168c, and a rear corner portion 168d positioned at the boundary between the rear end of the plateau portion 168c and the rear inclined portion 168e. When the lock protruding portions 168 engage the lock recessed portions 75 on the card connector 1, the rear corner portions 168d on the lock protruding portions 168 abut the rear inclined portions 75b of the lock recessed portions 75 of the card connector 1. Therefore, the rear corner portions 168d of the lock protruding portions 168 slide along the rear inclined portions 75b of the lock recessed portions 75 and are displaced outward in the transverse direction of the card connector 1 and forward. In this way, the card tray 160 is displaced forward.

Each side frame portion 164 includes an inner frame portion 164b facing the side end 111s of the card 101, an outer frame portion 164a on which a lock protruding portion 168 is formed, and a slit portion 164d separating the inner frame portion 164b and the rear frame portion 164a. In the initial state, the outer frame portions 164a extend in the longitudinal direction. Therefore, the outer frame portions 164a are rigid and do not interfere with the inner frame portions 164b even when the outer frame portions 164a are displaced.

The frame portion 161 includes a metal portion 151 consisting of a metal plate and a resin portion 161a coating at least some of the metal portion 151 on the periphery, the outer frame portions 164a have a laminate structure consisting of a metal layer and a resin layer, and the lock protruding portions 168 are elastically displaceable in a direction perpendicular to the lamination direction of the laminate structure. Therefore, the outer frame portions 164a do not experience separation of the metal layer from the resin layer and strong spring action is exerted.

The metal portion 151 includes a front metal frame portion 155, and the front end surface 155a of the front metal frame portion 155 is exposed to the front end surface 165a of the front frame portion 165. As a result, the front end surface 165a of the front frame portion 165 does not experience damage or wear and continues to function as the reference surface.

The present disclosure is not limited to the embodiments described above. Other modifications are possible within the spirit of the present disclosure and these are not excluded from the scope of the present disclosure.

The present disclosure can be applied to a card holding member and to a card connector.

The invention claimed is:

1. A card holding member able to hold a card having terminal members and able to be inserted into a card connector, the card holding member comprising:
a frame portion, the frame portion including a front frame portion, side frame portions, and a movable lock portion, the front frame portion being positioned forward in the insertion direction of the card holding member into the card connector, the side frame portions being connected at both ends to the front frame portion, and the movable lock portion being positioned on a side frame portion and able to engage and disengage from a lock portion on the card connector, the movable lock portion receiving force from the lock portion of the card connector forward in the insertion direction when engaging the lock portion of the card connector.

2. The card holding member according to claim 1, wherein the front end surface of the front frame portion presses against the front end portion of the card connector in the card insertion space when the movable lock portion engages the lock portion of the card connector.

3. The card holding member according to claim 1, wherein the movable lock portion is elastically displaceable in the transverse direction of the card holding member.

4. The card holding member according to claim 1, wherein the lock portion of the card connector includes a rear inclined portion facing the outside in the transverse direction moving forward,
the movable lock portion includes a lock side portion extending in the insertion direction, a rear inclined portion farther rearward in the insertion direction than the lock side portion, and a rear corner portion positioned at the boundary between the rear end of the lock side portion and the rear inclined portion, and
the rear corner portion of the movable lock portion contacts the rear inclined portion of the lock portion of the card connector when the movable lock portion engages the lock portion of the card connector.

5. The card holding member according to claim 4, wherein the frame portion includes a metal portion composed of a metal plate and a resin portion coating at least a section of the metal portion on the periphery, the metal portion not being exposed to the rear corner portion of the movable lock portion.

6. The card holding member according to claim 1, wherein the side frame portions include inner frame portions facing the side ends of the card, outer frame portions including the movable lock portion, and slit portions separating the inner frame portion and the outer frame portion, the outer frame portions extending linearly in the longitudinal direction in the initial state.

7. The card holding member according to claim 6, wherein the frame portion includes a metal portion composed of a metal plate and a resin portion coating at least a section of the metal portion on the periphery, the outer frame portion has a laminate structure of laminated metal and resin layers, and the movable lock portion is elastically displaceable on the direction perpendicular to the lamination direction of the laminate structure.

8. The card holding member according to claim 7, wherein the metal portion includes a front metal frame portion, and the front end surface of the front metal frame portion is exposed to the front end surface of the front frame portion.

9. The card connector able to receive an inserted card holding member according to claim 1, the card connector including a lock portion able to engage and disengage from the movable lock portion.

10. The card connector according to claim 9, further comprising a front end portion in the card insertion space able to abut the front end surface of the front frame portion.

11. A combination comprising:
a card connector having a lock portion; and
a card holding member, the card holding member being configured to hold a card having terminal members and being configured to be inserted into the card connector, the card holding member having a frame portion, the frame portion including a front frame portion, side frame portions, and a movable lock portion, the front frame portion being positioned forward in an insertion direction of the card holding member into the card connector, the side frame portions being connected at both ends to the front frame portion, and the movable lock portion being positioned on a side frame portion and being configured to engage and disengage from the lock portion of the card connector, the movable lock portion configured to receive force from the lock portion of the card connector forward in the insertion direction when engaging the lock portion of the card connector.

12. A card holding member which is configured to hold a card having terminal members and to be inserted into a card connector, the card holding member comprising:
a rear panel portion; and
a frame portion, the frame portion including a rear frame portion, a front frame portion, and a pair of side frame portions, the frame portion defining a space between the rear, front and side frame portions, the space being configured to accommodate the card, a rear of the rear frame portion is connected to the rear panel portion, each side frame portion having an outer side frame portion and an inner side frame portion, the outer and inner side frame portions defining a slit portion therebetween such that the outer side frame portion is configured to be elastically displaced toward the inner side frame portion, the outer side frame portion having a lock protruding portion provided opposite the slit portion, the lock protruding portion being configured to engage the card connector when the card holding member is inserted into the card connector.

13. The card holding member as defined in claim 12, wherein the lock protruding portion includes a lock side portion extending in the insertion direction, a rear inclined portion farther rearward in the insertion direction than the lock side portion, and a rear corner portion positioned at a boundary between a rear end of the lock side portion and the rear inclined portion.

14. The card holding member as defined in claim 13, wherein the frame portion includes a metal portion and a resin portion, the metal portion being composed of a metal plate, the resin portion coating at least a section of the metal portion on the periphery, the metal portion not being exposed to the rear corner portion of the lock protruding portion.

\* \* \* \* \*